(12) United States Patent
Spies et al.

(10) Patent No.: US 11,724,561 B2
(45) Date of Patent: Aug. 15, 2023

(54) DEVICE FOR REGULATING A FLOW THROUGH AND DISTRIBUTING A FLUID IN A FLUID CIRCUIT

(71) Applicant: Hanon Systems, Daejeon (KR)

(72) Inventors: Toni Spies, Cologne (DE); Tobias Haas, Cologne (DE); Dominik Wiechard, Cologne (DE); Markus Herzog, Bedburg (DE)

(73) Assignee: Hanon Systems, Daejeon (KR)

( * ) Notice: Subject to any disclaimer, the term of this patent is extended or adjusted under 35 U.S.C. 154(b) by 293 days.

(21) Appl. No.: 16/371,819

(22) Filed: Apr. 1, 2019

(65) Prior Publication Data
US 2019/0308489 A1  Oct. 10, 2019

(30) Foreign Application Priority Data
Apr. 5, 2018 (DE) .......................... 102018108013.1

(51) Int. Cl.
*F16K 11/087* (2006.01)
*B60H 1/00* (2006.01)
(Continued)

(52) U.S. Cl.
CPC ..... *B60H 1/00485* (2013.01); *B60H 1/00885* (2013.01); *F25B 41/20* (2021.01);
(Continued)

(58) Field of Classification Search
CPC .............. F25B 41/062; B60H 1/00485; B60H 1/00885; F16K 11/207; F16K 11/22; F16K 11/087–0876
(Continued)

(56) References Cited

U.S. PATENT DOCUMENTS 2,510,514 A * 6/1950 Mueller ................ F16K 5/0478
  251/297
2,934,311 A * 4/1960 Sjoholm .................. F16K 5/12
  251/209
(Continued)

FOREIGN PATENT DOCUMENTS

DE              10242727 A1 *  3/2004  .......... F16K 11/0876
DE     10 2013 206 626 A1     10/2014
(Continued)

*Primary Examiner* — Kevin F Murphy
(74) *Attorney, Agent, or Firm* — Norton Rose Fulbright US LLP; James R. Crawford

(57) ABSTRACT

Device for controlling a flow-through and distributing a fluid in at least one fluid circuit, in particular a refrigerant in a refrigerant circuit including a housing with ports for connecting with fluid lines, each of which is connected via a passage opening with the at least one interior volume of the housing, as well as with at least one valve element disposed in the interior volume of the housing with a drive element for moving the valve element relative to the housing. The at least one valve element is supported rotatably about a rotational axis and comprises at least three through openings developed as through-bores forming in the interior of the valve element a common volume. An axis of symmetry of a first opening and the rotational axis of the valve element are located on a common axis. The device is used in a refrigerant circuit of a thermal system.

17 Claims, 4 Drawing Sheets

(51) Int. Cl.
*F25B 41/325* (2021.01)
*F25B 41/35* (2021.01)
*F25B 41/20* (2021.01)

(52) U.S. Cl.
CPC ............ *F25B 41/325* (2021.01); *F25B 41/35* (2021.01); *F16K 11/0876* (2013.01)

(58) Field of Classification Search
USPC .............................. 137/614.21, 637.3, 887
See application file for complete search history.

(56) References Cited

U.S. PATENT DOCUMENTS

| | | | | | |
|---|---|---|---|---|---|
| 3,536,296 | A | * | 10/1970 | Burris | F16K 5/12 251/208 |
| 3,709,248 | A | * | 1/1973 | Aurich | F16K 11/22 137/271 |
| 3,746,048 | A | * | 7/1973 | Harper | F16K 35/14 137/628 |
| 3,773,291 | A | * | 11/1973 | Grauer | F16K 5/0605 251/315.04 |
| 4,019,536 | A | * | 4/1977 | Dong | F16K 11/0876 251/352 |
| 4,416,305 | A | * | 11/1983 | Commette | F16K 11/22 137/556 |
| 4,576,234 | A | * | 3/1986 | Upchurch | E21B 34/103 166/319 |
| 4,881,718 | A | * | 11/1989 | Champagne | F16K 5/0605 251/209 |
| 4,977,917 | A | * | 12/1990 | Adams | F16K 11/20 137/595 |
| 5,524,863 | A | * | 6/1996 | Davis | B08B 9/00 137/625.32 |
| 5,582,469 | A | * | 12/1996 | Jurgen | B60T 8/3645 303/119.3 |
| 6,021,812 | A | * | 2/2000 | Iwamoto | F16K 5/12 137/625.3 |
| 6,871,576 | B2 | * | 3/2005 | Vari | F15B 13/0814 137/15.21 |
| 7,322,559 | B2 | * | 1/2008 | Hall | F16K 5/0407 251/121 |
| 7,694,693 | B1 | * | 4/2010 | Edelman | A61F 7/02 137/625.3 |
| 8,844,567 | B2 | * | 9/2014 | Lockhart | F25B 41/40 137/551 |
| 9,004,106 | B2 | * | 4/2015 | Schlichter | B01D 35/12 137/637 |
| 9,222,597 | B2 | * | 12/2015 | Asokan | F16K 11/14 |
| 9,518,446 | B2 | * | 12/2016 | Reid | E21B 43/16 |
| 9,657,550 | B2 | * | 5/2017 | Inglis | E21B 34/101 |
| 10,690,040 | B2 | * | 6/2020 | Jang | F16K 5/12 |
| 2007/0113575 | A1 | * | 5/2007 | Borre | F25B 45/00 62/292 |
| 2011/0120578 | A1 | | 5/2011 | Lockhart | |
| 2014/0305154 | A1 | * | 10/2014 | Yoshioka | F16K 11/087 137/625 |
| 2016/0123479 | A1 | * | 5/2016 | Keller | F16K 47/02 251/309 |
| 2018/0297045 | A1 | * | 10/2018 | Eletto | B05B 15/555 |
| 2019/0049022 | A1 | * | 2/2019 | Tseng | F16K 11/0876 |

FOREIGN PATENT DOCUMENTS

| | | | |
|---|---|---|---|
| DE | 10 2014 105 097 A1 | 10/2015 | |
| DE | 102018201942 A1 * | 8/2019 | .......... F16K 11/0876 |
| JP | 2004060799 A | 2/2004 | |
| JP | 3594114 B2 | 11/2004 | |
| KR | 20090024046 A | 3/2009 | |
| WO | WO-2005033565 A1 * | 4/2005 | .............. F16K 11/22 |

* cited by examiner

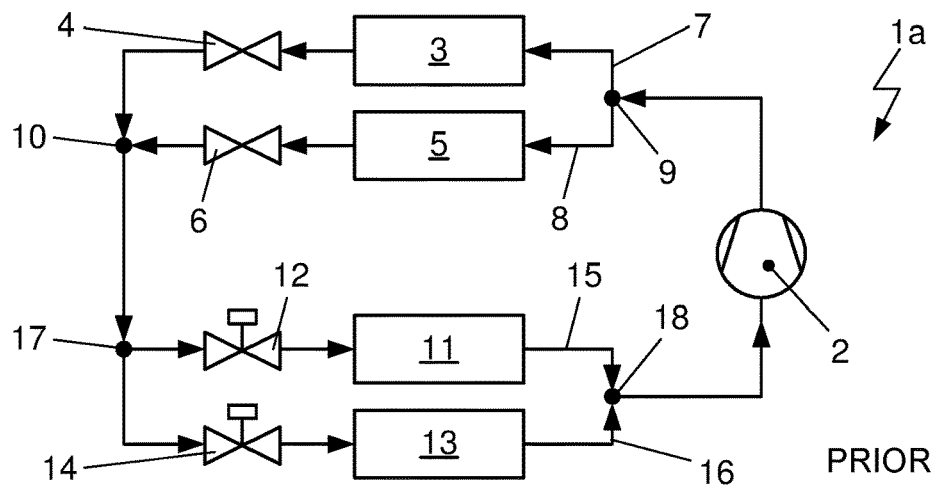
PRIOR ART
Fig. 1A
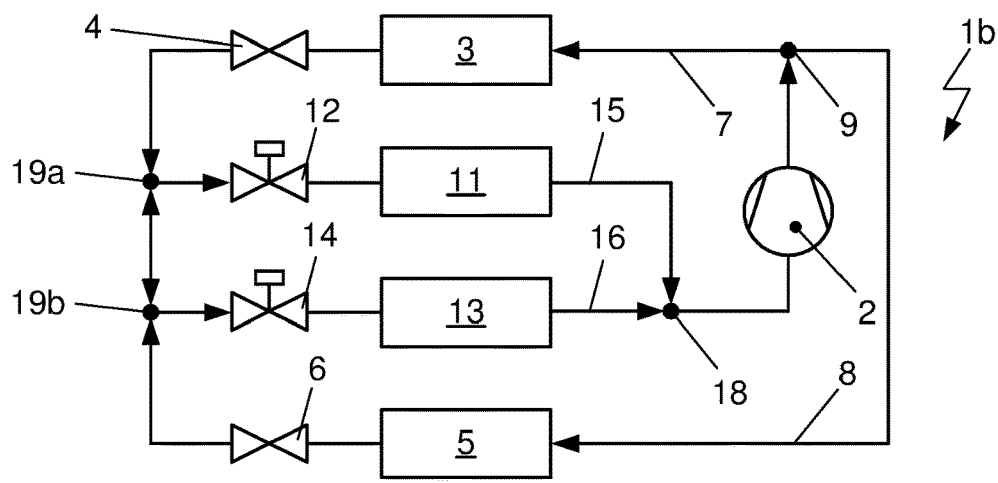
PRIOR ART
Fig. 1B
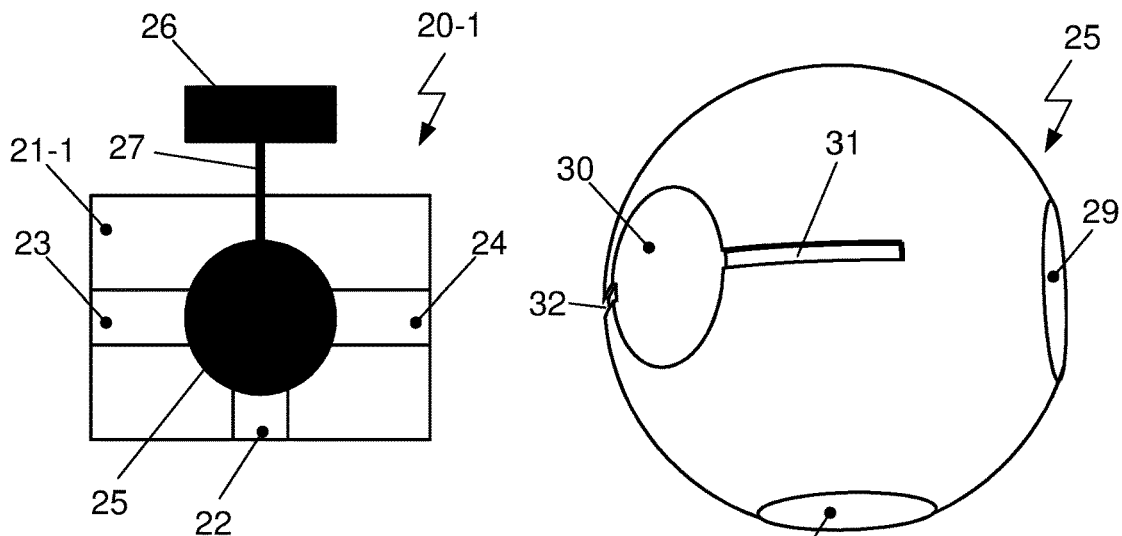
Fig. 2
Fig. 3

DEVICE FOR REGULATING A FLOW THROUGH AND DISTRIBUTING A FLUID IN A FLUID CIRCUIT

This application claims priority from German Patent Application No. 102018108013.1 filed on Apr. 5, 2018, which is hereby incorporated herein by reference in its entirety.

FIELD OF THE INVENTION

The invention relates to a device for controlling a flow-through and for distributing a fluid in a fluid circuit, particularly a refrigerant in a refrigerant circuit. The device comprises a housing with connection means for the connection with fluid lines, each of which being connected across passage openings with an interior volume of the housing, as well as a valve element, disposed in the interior volume of the housing, with a drive element for moving the valve element relative to the housing.

BACKGROUND OF THE INVENTION

In motor vehicles of prior art high demands made of the comfort of the occupants in the passenger compartment are met by climate control systems with different circuits for refrigerant and coolant, each with differently operated heat exchangers.

Due to the implementation with additional components of the electric drive train, such as a high-volt battery, an internal charger device, a transformer, an inverter as well as the electric motor, conventional motor vehicles with electromotive drive, termed electric vehicles for short, or motor vehicles with hybrid drive comprised of electric motor and internal combustion engine, furthermore, have most often higher cold or heat supply needs than motor vehicles that are driven purely by internal combustion engines. Apart from the refrigerant circuit of the climate control system proper, known motor vehicles with purely electric drive or electric hybrid drive are equipped with a coolant circuit in which the coolant, circulating for the discharge of the heat emitted by the drive components, is conducted through a coolant-refrigerant heat exchanger in order to transfer the heat from the coolant to the refrigerant circulating in the refrigerant circuit.

Said vehicles, in particular, have to be equipped with a feasibility for rapidly charging the electric energy stores, such as the high-volt battery of the drive train, which represents increased demands made of the cooling of the energy stores.

Due to the required energy needs, thermal systems of electrically driven motor vehicles have a significant impact on the range of the motor vehicles. For example, through the distribution of heat flows in the motor vehicle in line with requirements by using various subsystems, for example faster conditioning of components that require an optimal operating temperature is enabled. In motor vehicles operated with electric batteries and motor vehicles with hybrid drive in which, apart from conditioning the passenger compartment, for example the conditioning of the high-volt components of the electric drive train is also of particular interest, the impact the operation of the thermal systems has on the range of the motor vehicle has to be minimized.

Prior art furthermore discloses implementing refrigerant circuits of climate control systems so as to be operable in heat pump mode as well as also in chiller mode in order to distribute thermal energies within the motor vehicle. Particularly when operating the refrigerant circuit in heat pump mode for example, heat can be absorbed from ambient air or a coolant circuit which subsequently can be transferred to components of the motor vehicle that require heat. During operation in chiller mode heat can be absorbed from the passenger compartment or from the air flowing into the passenger compartment or other components and, for example, be transferred to the surrounding. Within the thermal systems the heat carrier circuits, such as the refrigerant circuits and the coolant circuits, are herein connected with one another as well as with further components of the motor vehicle. Especially in hybrid-driven motor vehicles major challenges are encountered when facing the problem of accommodating the thermal system for conditioning various components in the available installation space.

DE 10 2013 206 626 A1 discloses a refrigerant circuit for the climate control of a motor vehicle. The refrigerant circuit comprises a compressor as well as several heat exchangers operated as evaporators or condensers for the transfer of heat with the refrigerant. The refrigerant circuit is herein developed with at least three evaporators and two condensers, wherein upstream of each evaporator an expansion valve is connected for the pressure relief of the refrigerant and downstream of each condenser a nonreturn valve is connected to avoid refrigerant migrations within the refrigerant circuit. The components of the refrigerant circuit, in particular the large number of valves, are each integrated in the refrigerant circuit across connection lines.

Each valve is herein intended to carry out only one function so that in each case a multiplicity of valves and connection lines is required, which, aside from high costs, also entails significant weight of the refrigerant circuit and requires considerable installation space.

DE 10 2014 105 097 A1 discloses a valve block assembly for several valves, in particular for expansion valves or check valves. The assembly comprises a valve block with several flow paths for fluids as well as several adjustment units with associated drive units. The valve block is realized in two parts, one comprising a flow path element with the flow paths and the other a limiting element. The valve block assembly herein comprises specifically four refrigerant valves combined in one block in order to reduce in this manner also the number of connection lines in the refrigerant circuit.

The highly complex structural formation of the two-part valve block requires additional components, such as seals, ducts and threaded connections, which, in turn, leads to high production costs, a high susceptibility to error during the assembly, high requirements made of the leak tightness and strength and stability as well as to high weight.

Prior art, furthermore, does not reveal developing all valves of a fluid circuit, in particular of a refrigerant circuit, to be interconnected internally and therewith in a common block or housing.

OBJECTS AND SUMMARY OF THE INVENTION

The invention addresses the problem of providing a device for controlling a flow-through and distributing a fluid in a fluid circuit, in particular in a refrigerant circuit, of a thermal system of a motor vehicle. Herein with a minimal number of components a maximal number of heat sources and heat sinks of the thermal system, specifically of an electric battery-driven or hybrid-driven motor vehicle, are to be connected with one another at the refrigerant side. Refrigerants at different temperature levels are to be available for different components. In addition, the production, maintenance and operating costs as well as the necessary installation space are herein to be minimal. The thermal system is to be operable at maximal efficiency.

The problem is resolved through the subject matters with the characteristics of the independent claims. Further developments are specified in the dependent claims.

The problem is resolved through a device for controlling a flow-through and distributing a fluid in a fluid circuit, in particular a refrigerant in a refrigerant circuit. The device comprises a housing with connection means for the connection with fluid lines, each of which being connected by a passage opening with at least one interior volume of the housing, as well as at least one valve element, disposed in the interior volume of the housing, with a drive element for moving the valve element relative to the housing.

According to the concept of the invention, the at least one valve element is supported such that it is rotatable about a rotational axis and comprises at least three openings developed as through-bores which form a common volume in the interior of the valve element. An axis of symmetry of a first opening and the rotational axis of the valve element are located on a common axis. The valve element is advantageously spherical or has the form of a circular cylinder.

According to a further development of the invention, the first opening of the valve element is implemented on a side of the housing that is opposite to the side oriented toward the drive element. In the case the valve element has a spherical formation, the first opening of the valve element and the drive element are disposed diametrically to one another, while with the formation of the valve element as circular cylinder the first opening of the valve element and the drive element are each disposed in the region of the end faces of the circular cylinder.

In a preferred embodiment of the invention the at least one valve element is disposed within the housing in an orientation such that the through-bore of the first opening of the valve element and the passage opening of a first port form a common passageway, in particular form a flow channel for the fluid. The axis of symmetry of the first opening of the valve element and an axis of symmetry of the passage opening of the first port are located on a common axis.

The through-bores of the openings of the valve element are preferably implemented with identical diameters that are constant over their length.

The axes of symmetry of the openings, developed in particular in the form of circular cylinders, and the rotational axis of the valve element advantageously have a common point of intersection in the center of the valve element.

According to a further preferred embodiment of the invention, a second opening and a third opening of the valve element are disposed in a common center plane of the valve element at an angle to each other differing from 0° and from 180°. The center plane is herein oriented orthogonally to the rotational axis of the valve element. The angle is spanned in the center plane.

A further advantage of the invention comprises that on the surface of the valve element, starting from an edge of the third opening, at least one groove is developed which extends along the center plane of the valve element and is connected with the volume of the opening.

On the surface of the valve element, starting from the edge of the third opening, preferably two grooves, in particular of equal and constant width, equal and constant depth as well as equal and constant length, are developed. The groves extend on both sides of the third zo opening along the center plane of the valve element. A second groove, extending from the third opening, of the valve element is implemented diametrically opposite.

According to a further development of the invention, axes of symmetry of the passage openings of the first port, of a second port as well as of a third port of the housing and the rotational axis of a valve element have a common point of intersection in which the valve element is disposed with a center point.

According to an advantageous embodiment of the invention, the at least one valve element is connected across a connection element with a drive element disposed outside of the housing. With the formation of the device with at least two valve elements, each valve element is preferably connected across a connection element with a drive element such that the valve elements are movable independently of one another.

According to a further advantage of the invention, the passage openings of the second port and of the third port of the housing are located on a common axis. The passage opening of the first port and the connection element are, furthermore, disposed on a common axis such that the passage openings of the ports of the housing are oriented to one another in the form of a T.

The first port is preferably disposed on an opposite side of the drive element to the valve element. The second port and the third port are, furthermore, provided on sides, opposite to one another and differing from the side of the first port, of the preferably cuboidal housing.

The connection element is advantageously realized as a shaft. The connection element is herein in particular fixedly connected at a first end with the drive element and at a second end, developed distally to the first end, projects through a side into the housing and connects to the valve element.

The drive element is preferably developed as an electrical servomotor, in particular as a stepping motor.

A further advantage of the invention comprises that in the case of a formation of the device with an even number of at least two valve elements, two drive elements of the valve elements are disposed on opposite sides of the housing and the rotational axes of the valve elements are located on a common axis.

With the implementation of the device with at least two valve elements, the passage openings of the first ports are preferably connected with one another at a connection site.

The device according to the invention is developed as a highly integrated component, especially as a refrigerant valve, for carrying out several functions. In the device a multiplicity of functions of individual valves are combined.

The advantageous embodiment of the invention permits the use of the device for controlling a through-flow and distributing a fluid in a refrigerant circuit of a thermal system, in particular of a thermal management system, of a motor vehicle for conditioning at least one air mass flow to be supplied to a passenger compartment as well as for conditioning at least one component of a drive train. The thermal system may comprise at least the one refrigerant circuit as well as at least one coolant circuit also for absorbing heat from the refrigerant circuit. The device in this case serves as an adaptive multiway refrigerant valve for the vehicle climate control.

In summary, as a highly variable refrigerant valve with a multiplicity of possible flow paths for the flow-through of refrigerant, the device according to the invention comprises in particular diverse and manifold advantages:

with a minimal number of components a maximal number of heat sources and heat sinks of the thermal system, specifically of an electric battery-driven or hybrid-powered motor vehicle, can be connected with one another at the refrigerant side, reduced complexity in the assembly leads to lower error and failure probability, which reduces the warranty costs to be expected, minimization of weight, minimization of leakage of refrigerant through the omission of connection lines and sites to be sealed and thereby a reduction of the costs for the end consumer in the event of service, as well as protection of environment and collector and/or accumulator volume to be smaller dimensioned since low initial refrigerant filling quantities are required, and thereby minimal costs for the motor vehicle producer, refrigerant at different temperature levels for different components is made available depending on requirement, maximal efficiency in operating the thermal system, and minimal production, maintenance and operating costs as well as minimal required installation space.

Further details, characteristics and advantages of embodiments of the invention will become evident based on the following description of embodiment examples with reference to the associated drawing.

BRIEF DESCRIPTION OF THE DRAWINGS

FIG. 1A: a refrigerant circuit of a climate control system of a motor vehicle with several heat exchangers of prior art, operated as evaporators or condensers, FIG. 1B: a refrigerant circuit, similar to the refrigerant circuit according to FIG. 1A of prior art, operable in heat pump mode, FIG. 2: a first embodiment of a device for controlling a flow-through and distributing a fluid in a fluid circuit, in particular a valve for refrigerant circuits of a thermal system of a motor vehicle in schematic representation, FIG. 3: a valve element of a device of FIG. 2, FIG. 4: a refrigerant circuit operable in heat pump mode, similar to the refrigerant circuit of FIG. 1b, with devices for controlling the flow-through and distribution of the refrigerant according to FIG. 2 with a valve element according to FIG. 3, FIG. 5A-5D: different switching variants of the valve element of FIG. 3 of the devices of FIG. 4, FIG. 6: a second embodiment of the device for controlling a flow-through and distributing a fluid in a fluid circuit, in particular a valve for refrigerant circuits of a thermal system of a motor vehicle in schematic representation.

DETAILED DESCRIPTION

Figure 4:
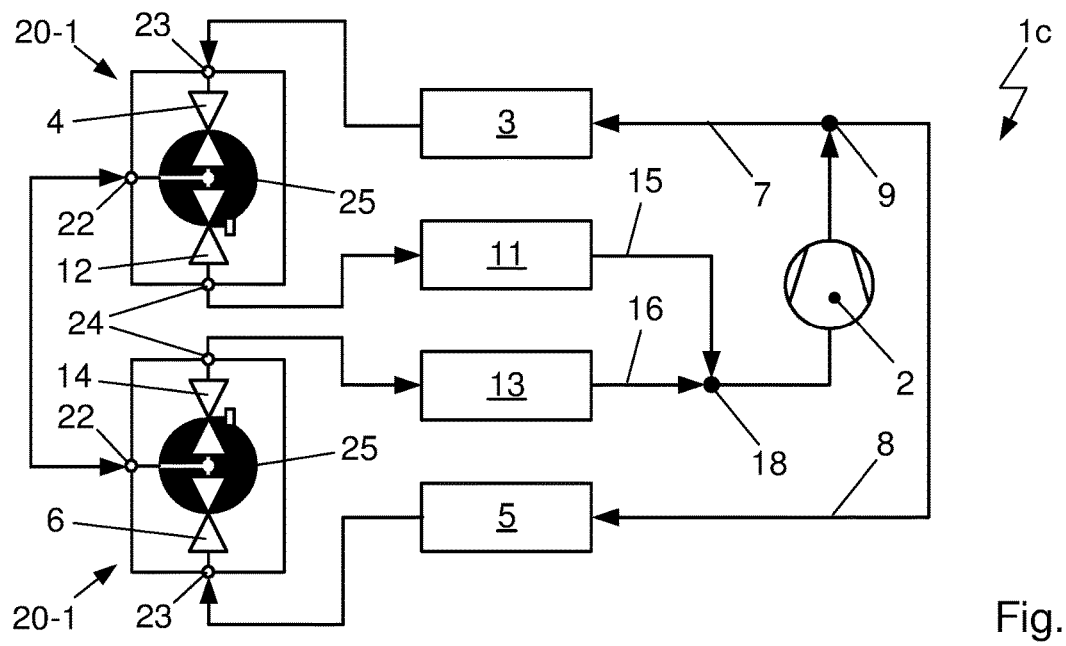

In FIGS. 1A and 1B a refrigerant circuit 1a, 1b of a climate control system of a motor vehicle is shown with a compressor 2 and several heat exchangers 3, 5, 11, 12, operable as evaporators or condensers/gas coolers, for the transfer of heat with the refrigerant of prior art. The refrigerant circuits are each implemented with two condensers/gas coolers 3, 5 and two evaporators 11, 13, wherein, in the direction of flow of the refrigerant, downstream of each condenser/gas cooler 3, 5 is connected a valve 4, 6, in particular a check valve, specifically a magnetic valve, for dividing the mass flow of the refrigerant, or a nonreturn valve to avoid refrigerant migrations within the refrigerant circuit 1a, 1b, and upstream of each evaporator 11, 13 is connected an expansion element 12, 14, in particular an expansion valve, for relieving the pressure of the refrigerant. The components of the refrigerant circuit 1a, 1b are fluidically interconnected across connection lines.

The refrigerant flowing out of the compressor 2 in the form of a high-pressure gas can, depending on the requirement, be routed into a first flow path 7 and/or into a second flow path 8, which extend from a branch site 9 to an opening site 10 or up to a connection site 19a, 19b. The mass flow of the refrigerant can be continuously varied at the branch site 9 between 0 and 100%. Within the first flow path 7 a first condenser/gas cooler 3 with a downstream first valve 4 is realized, while within the second flow path 8 a second condenser/gas cooler 5 with a downstream second valve is realized. The flow paths 7, 8 can be supplied with refrigerant in parallel.

In addition, the refrigerant flowing out of the flow paths 7, 8 can, as needed, be routed into a third flow path 15 and/or a fourth flow path 16 that extend from a branch site 17 or connection site 19a, 19b up to an opening site 18. The mass flow of the refrigerant can be divided continuously between 0 and 100% at the branch site 17 or the connection sites 19a, 19b. Within the third flow path 15 a first evaporator 11 with an upstream first expansion valve 12 is implemented, while within the fourth flow path 16 a second evaporator 13 with an upstream second expansion valve 14 is implemented. The flow paths 15, 16 can be supplied with refrigerant in parallel.

If the refrigerant is liquified under subcritical operation of the refrigerant circuit, such as for example with the refrigerant R134a or at certain ambient conditions with carbon dioxide, the heat exchanger is termed a condenser. A portion of the heat exchange takes place at constant temperature. In supercritical operation or supercritical heat output in the heat exchanger, the temperature of the refrigerant decreases steadily. In this case the heat exchanger is also referred to as gas cooler. Supercritical operation can occur under certain ambient conditions or operating modes of the refrigerant circuit, for example during operation with the refrigerant carbon dioxide.

Each valve 4, 6, 12, 14 is developed for carrying out only one function such that a multiplicity of valves and connection lines is required.

In FIG. 2 is shown in schematic representation a first embodiment of a device 20-1 for controlling a flow-through and for distributing a fluid in a fluid circuit, in particular a valve for refrigerant circuits of a thermal system of a motor vehicle. The device 20-1 is implemented as a highly integrated refrigerant valve for carrying out several functions in order to replace at least two prior art valves and to reduce the number of four valves to two components.

The device 20-1 comprises a preferably cuboidal housing 21-1 with a first port 22 as a secondary inlet/outlet of the refrigerant, a second port 23 as a primary inlet of the refrigerant as well as a third port 24 as an outlet of the refrigerant to a heat exchanger operated as evaporator. The ports 22, 23, 24 for refrigerant lines as connection lines with other components of the refrigerant circuit are each connected via passage openings with an interior volume of housing 21-1. Within the volume a valve element 25 is disposed. Axes of symmetry of the passage openings of the ports 22, 23, 24 and a rotational axis of valve element 25 have a common point of intersection in which the valve element 25 is disposed.

Except in the proximities of ports 22, 23, 24, the housing 21-1 is closed. The outer form of housing 21-1 is implemented such that the functions, for example also the precise disposition within a system, is ensured and that a cost-efficient series production is enabled at minimal component weight.

The spherical valve element 25 is connected across a connection element 27 with a drive element 26 located outside of housing 21-1. The connection element 27, developed, for example, as a shaft or a setting shaft, is fixedly connected at a first end with the drive element 26. With a second end, developed distally to the first end, the connection element 27 is disposed such that it projects through the wall of housing 21-1 into housing 21-1. The drive element 26 is developed, for example, as a servomotor for driving the connection element 27.

The first port 22 is disposed on the opposite the side of the drive element 26 on housing 21-1, while the second port 23 and the third port 24 are developed on sides opposite to one another and differing from the side of the first port 22. The passage openings of the second port 23 and of the third port 24 are located on a common axis, while the passage opening of the first port 22 and the connection element 27 are disposed on a common axis. The passage openings of ports 22, 23, 24 are implemented in the form of a T with respect to one another, with the center axes of the passage openings intersecting in the center point of valve element 25.

In FIG. 3 is depicted a valve 25 of a device 20-1 of FIG. 2. The valve element 25 comprises three openings 28, 29, 30 developed as through-bores with identical and constant diameters over the length of openings 28, 29, 30.

The axes of symmetry of the circular cylindrical openings 28, 29, 30 and the rotational axis of valve element 25 have a common point of intersection in the center of valve element 25. The axis of symmetry of a first opening 28 is herein oriented coaxially with the rotational axis of valve element 25. Stated differently, the axis of symmetry of the first opening 28 and the rotational axis of valve element 25 are located on a common axis.

The first opening 28 of valve element 25 is developed on a side that is opposite to the side with the connection of valve element 25 with the connection element 27 of drive element 26. The first opening 28 and the connection element 27 of drive element 26 are consequently implemented diametrically to one another on valve element 25.

A second opening 29 and a third opening 30 are disposed in a common center plane, oriented orthogonally to the rotational axis of valve element 25, at an angle with respect to one another that differs from 0° and from 180°. The third opening 30, in addition, comprises grooves 31, 32 on the surface of valve element 25 that are preferably of constant width and constant depth. Starting from the edge of the third opening 30 of the center plane of valve element 25, the grooves 31, 32, each developed as an elongated recess, extend in the direction of the second opening 29. Having the same length and being developed as expansion indentations for the refrigerant, the grooves 31, 32 are disposed in the center plane of the second opening 29 and of the third opening 30. A second groove 32 extends in a region diametrically opposite to the second opening 29.

According to an embodiment not depicted, instead of grooves 31, 32 through-bores with a lesser diameter than the diameter of the third opening 30 are provided, which extend from the great circle, meaning the center plane of valve element 25 with openings 29, 30, into the open volume defined by openings 28, 29, 30 within the valve element 25.

The spherical valve element 25 is according to FIG. 2 oriented within the housing 21-1 such that the through-bore of the first opening 28 of valve element 25 and the passage opening of the first port 22 of housing 21-1 form a common passageway. The axes of symmetry of the first opening 28 of valve element 25 and of the passage opening of the first port 22 of housing 21-1 are disposed coaxially with respect to one another or on a common axis.

Valve element 25 with openings 28, 29, 30 is movably disposed within housing 21-1 with ports 22, 23, 24 as well with the associated passage openings to block or enable flow-through openings for the refrigerant. The valve element 25 is, in addition, sealed fluidtight from housing 21-1 in order to provide selectively inlets and outlets for the refrigerant. The fabrication tolerances of the individual components of device 20-1 are selected such that the fluid, in particular the refrigerant, can only flow through ports 22, 23, 24 with the passage openings as well as openings 28, 29, 30 of the valve element 25 and undesirable bypass flows between the surface of valve element 25 and housing 21-1 are avoided.

FIG. 4 shows a refrigerant circuit 1c, similar to FIG. 1B, operable in heat pump mode, with two devices 20-1 according to the invention for the control of the flow-through and distribution of the refrigerant according to FIG. 2, each with a valve element 25 according to FIG. 3. The difference between the refrigerant circuit 1c and the refrigerant circuit 1b of FIG. 1B lies in the formation of devices 20-1 instead of valves 4, 6, 12, 14. Devices 20-1 replace a valve 4, 6, developed as nonreturn valve, and a valve 12, 14, developed as expansion valve, which are shown for illustration integrated into the symbols of devices 20-1. Like components of refrigerant circuits 1b, 1c are designated by like reference symbols. In addition, reference is made to the description of the refrigerant circuit in connection with FIG. 1B.

The connection lines between valves 4, 6 and the connection sites 19a, 19b as well as between the connection sites 19a, 19b and valve 12, 14 are omitted.

The refrigerant circuit 1c in which a device 20-1 is utilized, can be operated with any refrigerant, in particular with R1234yf, R134a, R744, R404a, R600a, R290, R152a, R32 as well as with mixtures thereof.

In FIG. 5A to 5D are shown different switching variants of valve element 25 from FIG. 3 of a device 20-1 from FIG. 4 that can be set by rotation of valve element 25 about the rotational axis 33 within housing 21-1 and relative to housing 21-1. By turning valve element 25 with the openings 28, 29, 30 within housing 21-1 with ports 22, 23, 24 as well as the associated passage openings in the rotational direction 34, predetermined flow openings, and therewith flow paths for the refrigerant through the refrigerant circuit, are opened or closed. The pressure of the refrigerant, moreover, can, depending on the enabled through-flow opening, be relieved to a lower pressure level during its conduction through one of the grooves 31, 32 developed as expansion indentations for the refrigerant. Device 20-1 is developed in connection with the valve element 25 such that the first port 22 for the inlet or outlet of refrigerant is always open when connected with the first opening 28.

Figure 5A:
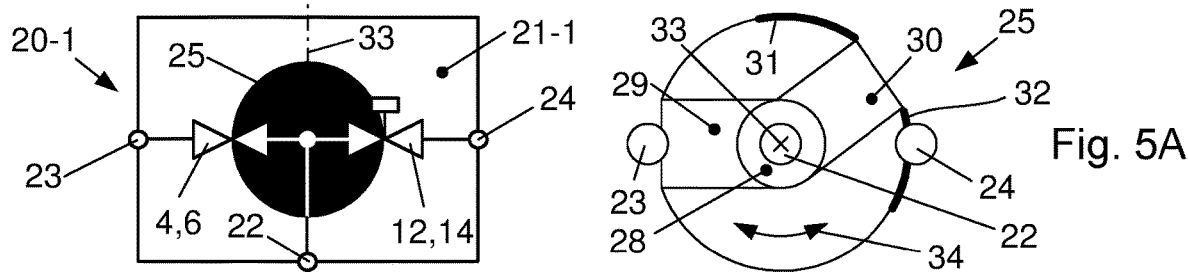

FIG. 5A shows a position of valve element 25 at a switching of the device 20-1 with an opened second port 23 for the inlet of refrigerant. The axes of symmetry of the passage opening of the second port 23 of housing 21-1 and of the second opening 29 of the valve element 25 are oriented coaxially with one another. The third port 24 is also opened although the axes of symmetry, intersecting in the center point of valve element 25, of the passage opening of the third port 24 of housing 21-1 and of the third opening 30 of valve element 25 are oriented at an angle and thus are not oriented coaxially with one another. The passage opening of the third port 24 of housing 21-1 is connected with the third opening 30 of valve element 25 across the second groove 32 developed as an expansion indentation. During its flow through the second groove 32 the refrigerant is pressure-relieved and flows out of the device 20-1 at a low pressure level.

When applying the device 20-1 in the refrigerant circuit 1*c* according to FIG. 4, at the stated switching at least one flow path 7, 8, developed with a condenser/gas cooler 3, 5, is enabled and the refrigerant at the low pressure level in the two-phase area can be routed into at least one flow path 15, 16 comprising an evaporator 11, 13.

Figure 5B:
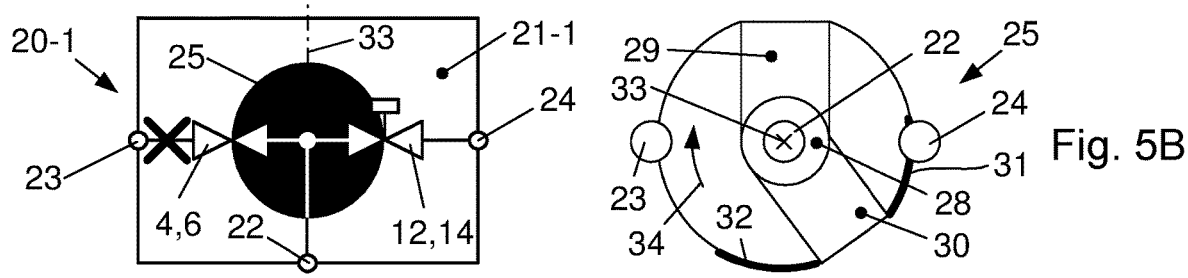

FIG. 5B shows a position of the valve element 25 after a rotation, starting from the position according to FIG. 5A, about the rotational axis 33 by 90° in the direction of rotation 34 at the switching of device 20-1 with a closed second port 23. The axes of symmetry, intersecting in the center point of valve element 25, of the passage opening of the second port 23 of housing 21-1 and of the second opening 29 of the valve element 25 are oriented at an angle and therewith are not oriented coaxially with one another. The third port 24 is opened although the axes of symmetry of the passage opening of the third port 24 of housing 21-1 and of the third opening 30 of valve element 25 are again at an angle and thus are not oriented coaxially with respect to one another. The passage opening of the third port 24 of housing 21-1 is herein connected via the first groove 31, developed as expansion indentation, with the third opening 30 of valve element 25. During its flow through the first groove 31 the pressure of the refrigerant is relieved and it flows at a low-pressure level out of the device 20-1.

When utilizing the device 20-1 in the refrigerant circuit 1*c* according to FIG. 4, at the stated switching one flow path 7, 8, developed with a condenser/gas cooler 3, 5, is blocked and the refrigerant at the low-pressure level in the two-phase area can be routed into a flow path 15, 16 comprising an evaporator 11, 13.

Figure 5C:
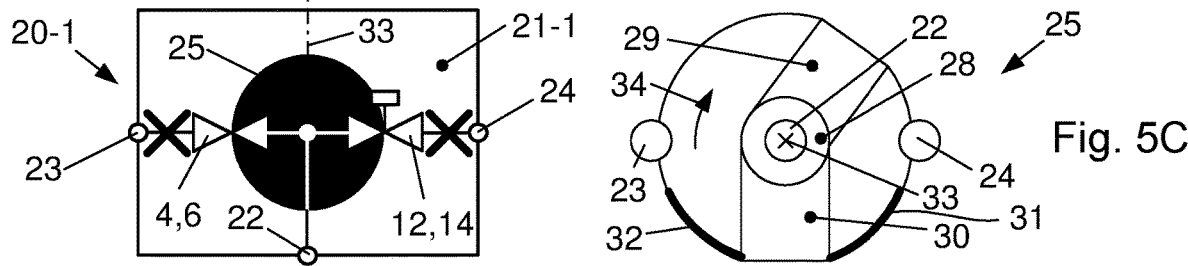

FIG. 5C shows a position of valve element 25 after a further rotation in the rotational direction 34 about the rotational axis 33, starting from the position according to FIG. 5B, at a switching of device 20-1 with a closed second port 23 and closed third port 24. The axes of symmetry of the passage opening of the second port 23 or of the third port 24 of housing 21-1, and of the second opening 29 or of the third opening 30 of valve element 25 intersecting in the center point of valve element 25 are at an angle and therewith are not oriented coaxially with one another. The grooves 31, 32, developed in the region of the third opening 30, are also completely covered by housing 21-1.

When operating the device 20-1 in the refrigerant circuit 1*c* according to FIG. 4, at the stated switching a flow path 7, 8, developed with a condenser/gas cooler 3, 5, as well as also a flow path 15, 16 comprising an evaporator 11, 13 is closed.

Figure 5D:
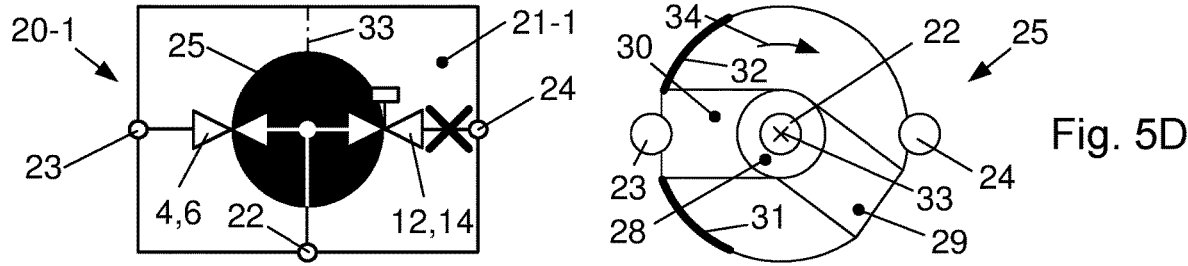

FIG. 5D shows a position of the valve element 25 after a further rotation in the rotational direction 34 by 90° about the rotational axis 33, starting from the position according to FIG. 5C, at a switching of device 20-1 with an opened second port 23 for the admission of refrigerant and a closed third port 24. The axes of symmetry of the passage opening of the second port 23 of housing 21-1 and of the third opening 30 of valve element 25 are oriented coaxially with one another, while the axes of symmetry of the passage opening of the third port 24 of housing 21-1 and of the second opening 29 of valve element 25 are oriented at an angle to one another and are therewith not oriented coaxially with one another.

When operating the device 20-1 in the refrigerant circuit 1*c* according to FIG. 4, at said switching at least one flow path 7, 8 developed with a condenser/gas cooler 3, 5, is opened and one flow path 15, 16, comprising an evaporator 11, 13, is closed.

Figure 6:
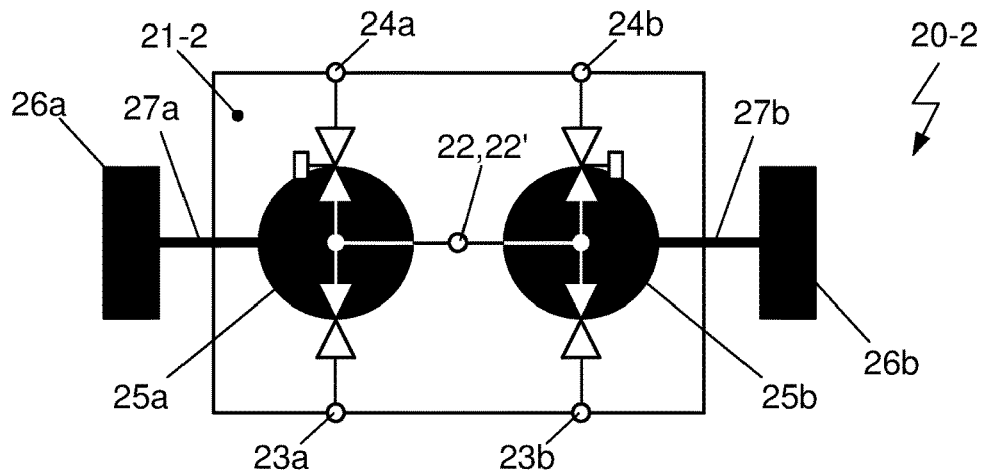

Starting from the refrigerant circuit 1*c* of FIG. 4, both devices 20-1 can be integrated into a common device 20-2 with a housing 21-2 according to FIG. 6. Herein the connection line between the first ports 22 is omitted such that, due to the connection interior to the device, no exterior leakage at the first ports 22 is possible.

In FIG. 6 a second embodiment is shown in schematic representation of device 20-2 for controlling a flow-through and distributing a fluid in a fluid circuit, in particular a valve for refrigerant circuits of a thermal system of a motor vehicle. The device 20-2 is implemented as a highly integrated refrigerant valve for carrying out several functions in order to replace at least four valves according to prior and to reduce the number of four valves to one component.

The device 20-2 is substantially implemented of two devices 20-1 according to FIGS. 2 to 4 which are disposed within a common housing 21-2. The original devices 20-1 are connected with one another at the refrigerant side across the first ports 22 developed on an underside of the cuboidal housing 21-1. The coupling site of the first ports 22 of two devices 20-1 corresponds to the connection site 22'. The individual functions of the two original devices 20-1 are therewith combined with one another.

The device 20-2 preferably comprises a cuboidal housing 21-2 with two second ports 23*a*, 24*b* as inlets of the refrigerant as well as two third ports 24*a*, 24*b* as outlets of the refrigerant, each to a heat exchanger operated as evaporator. Ports 23*a*, 23*b*, 24*a*, 24*b* for refrigerant lines as connection lines with other components of the refrigerant circuit are each connected across passage openings with interior volumes of housing 21-2. Within each of the volumes a valve element 25*a*, 25*b* according to valve element 25 of FIG. 3 is disposed. The axes of symmetry of the passage openings of ports 23*a*, 24*a* and the rotational axis of a first valve element 25*a*, on the one hand, as well as the axes of symmetry of the passage openings of ports 23*b*, 24*b* and the rotational axis of a second valve element 25*b*, on the other hand, have each a common point of intersection in which the particular valve element 25*a*, 25*b* is disposed.

The spherical valve elements 25*a*, 25*b* are each connected across a connection element 27*a*, 27*b* with a drive element 26*a*, 26*b* disposed outside of housing 21-2. The connection elements 27*a*, 27*b*, developed for example as shafts or as setting shafts, are fixedly connected at a first end with the drive element 26*a*, 26*b*. With the second end, developed distally to the first end, the connection elements 27*a*, 27*b* are disposed such that they project through the wall of housing 21-2 into the housing 21-2. The drive elements 26*a*, 26*b* positioned on opposing sides of housing 21-2 are each developed as a servomotor for example for driving the connection elements 27*a*, 27*b*. The rotational axes of the valve elements 25*a*, 25*b* are coaxial and therewith oriented on a common axis. The rotational movements generated by the drive elements 26*a*, 26*b*, are transmitted across the connection elements 27*a*, 27*b* to the valve elements 25*a*, 25*b*, whereby the valve elements 25*a*, 25*b* can be moved independently of one another by means of the drive elements 26a, 26b about their rotational axis.

The second ports 23a, 23b developed in common on a first side of housing 21-2, and the third ports 24a, 24b, developed in common on a second side of housing 21-2, are disposed opposite to one another. The passage openings of a second port 23a, 23b and of a third port 24a, 24b are oriented on a common axis. The connection elements 27a, 27b are, in addition, disposed on a common axis.

The passage openings of a second port 23a, 23b, of a third port 24a, 24b and of the connection site 22' are developed in the form of a T with respect to one another, wherein the center axes of the passage openings intersect in the center point of a valve element 25a, 25b. Coaxially with the common axis of rotation of the valve elements 25a, 25b, a through-bore is implemented to be able to mount the connection elements 27a, 27b of drive elements 26a, 26b and the refrigerant-side connection between both valve elements 25a, 25b or the connection to the connection site 22' is established.

Housing 21-2, furthermore, comprises two through-bores, oriented in the direction from a second port 23a, 23b to a third port 24a, 24b, and therewith vertically to the through-bore of the two connection elements 27a, 27b of the drive elements 26a, 26b, such that the spherical valve elements 25a, 25b can be placed into the housing 21-2. After the valve elements 25a, 25b have been emplaced, plates with bearing shells are introduced bilaterally, in particular bolted, into the housing 21-2, such that the valve elements 25a, 25b are also sealed fluidtight against the outside.

Instead of a vertical through-bore developed with the diameter of the valve elements 25a, 25b, a combination of two bores with differently sized diameters can alternatively also be provided, wherein a first diameter corresponds to the diameter of valve element 25a, 25b plus a tolerance for the rotating movement and a second diameter to a passage opening of a port 23a, 23b, 24a, 24b, such that the introduction, in particular the bolting, of a plate for closing the device 20-2 is only required on one side. The diameter of a passage opening of a port 23a, 23b, 24a, 24b is herein less than the diameter of the valve element 25a, 25b.

Figure 7:
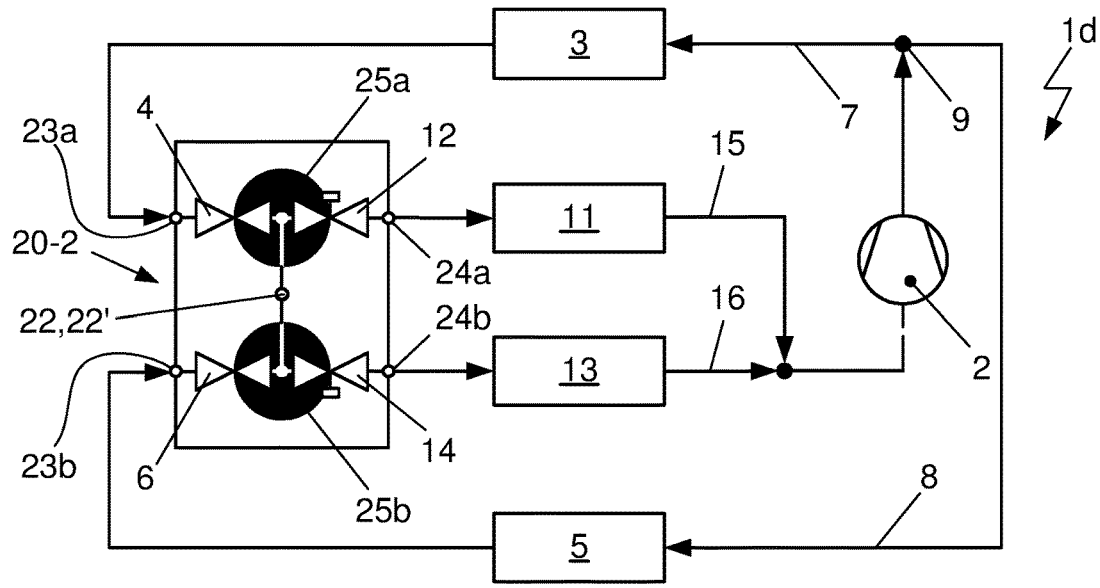
FIG. 7: The refrigerant circuit of FIG. 1B operable in heat pump mode with a device for controlling a flow-through and distributing the refrigerant according to FIG. 6, FIG. 8: a third embodiment of the device according to the invention, as well as FIG. 9: a fourth embodiment of the device according to the invention.

FIG. 7 depicts a refrigerant circuit 1d similar to FIG. 16 and FIG. 4, operable in heat pump mode, with a device 20-2 according to the invention for controlling a flow-through and for distributing the refrigerant according to FIG. 6 with valve elements 25a, 25b according to FIG. 3. The difference between the refrigerant circuit 1d and the refrigerant circuit 1c from FIG. 4 lies in the formation of the device 20-2 instead of the valves 4, 6, 12, 14. Device 20-2 replaces the valves 4, 6 developed as nonreturn valves and the valves 12, 14, developed as expansion valves, which, for illustration, are shown as integrated into the symbol of device 20-2. Like components of the refrigerant circuits 1b, 1c, 1d are designated by like reference symbols. In addition, reference is made to the description of the refrigerant circuit in connection with FIGS. 1A and 1B.

In comparison to the refrigerant circuit 1b of FIG. 1B, in the refrigerant circuit 1d the connection lines between valves 4, 6 and the connection sites 19a, 19b between connections 19a, 19b and valves 12, 14 as well as the connection line between connection sites 19a, 19b, are omitted. In comparison to the refrigerant circuit 1c of FIG. 4, in the refrigerant circuit 1d the connection line between the first ports 22 is omitted.

Device 20-2 can have a, not shown, greater interior volume in the region of the connection site 22 in order to store refrigerant in the interior of the device 20-2 to ensure that, independently of operating points and exterior leakage, an adapted refrigerant fill quantity is always available in the refrigerant circuit, or, for example, to dispose therein a desiccant for drying a refrigerant/oil mixture.

Figure 8:
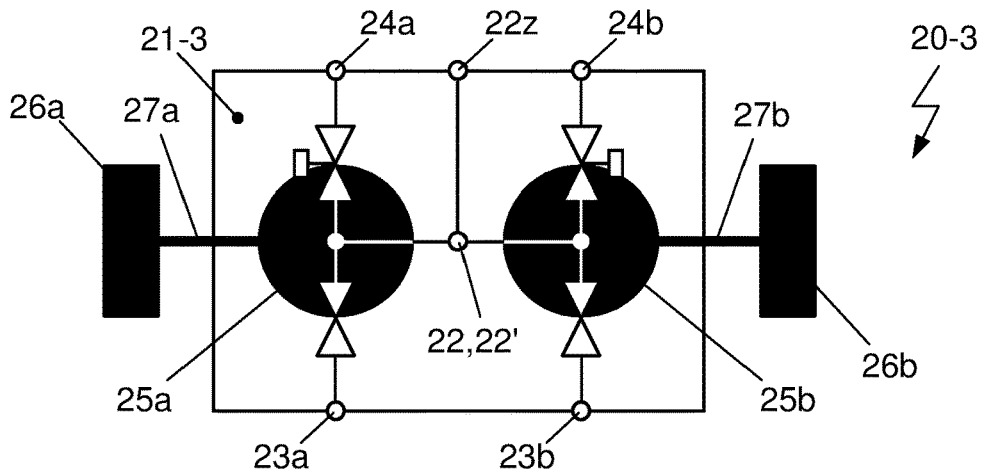

FIG. 8 depicts a third embodiment of the device 20-3 according to the invention. In comparison to the device 20-2 of FIG. 6, the housing 21-3 of device 20-3 according to FIG. 8 is developed with at least one additional first port 22z. The additional first port 22z is fluidically coupled with the connection site 22 across a passage opening. The connection site 22' can herein also be developed with a greater interior volume.

To the additional first port 22z of device 20-3 can be connected directly or across connection lines various components of the refrigerant circuit, such as an accumulator, a refrigerant collector, a pressure sensor and/or a temperature sensor, an external valve, such as a pressure relief valve, a burst disk, a separator, a heat exchanger, such as an internal heat exchanger, a condenser/gas cooler or an evaporator, a compressor or an expander or an ejector. Additional valves or sensors can, furthermore, be integrated within the housing 21-3 of the device 20-3.

By internal heat exchanger is herein to be understood a heat exchanger internal to the circuit, which serves for the heat exchange between the refrigerant at high pressure and the refrigerant at low pressure.

Herein, for example, the liquid refrigerant is further cooled after the condensation, on the one hand, and, on the other hand, the suction gas is superheated before the compressor.

Figure 9:
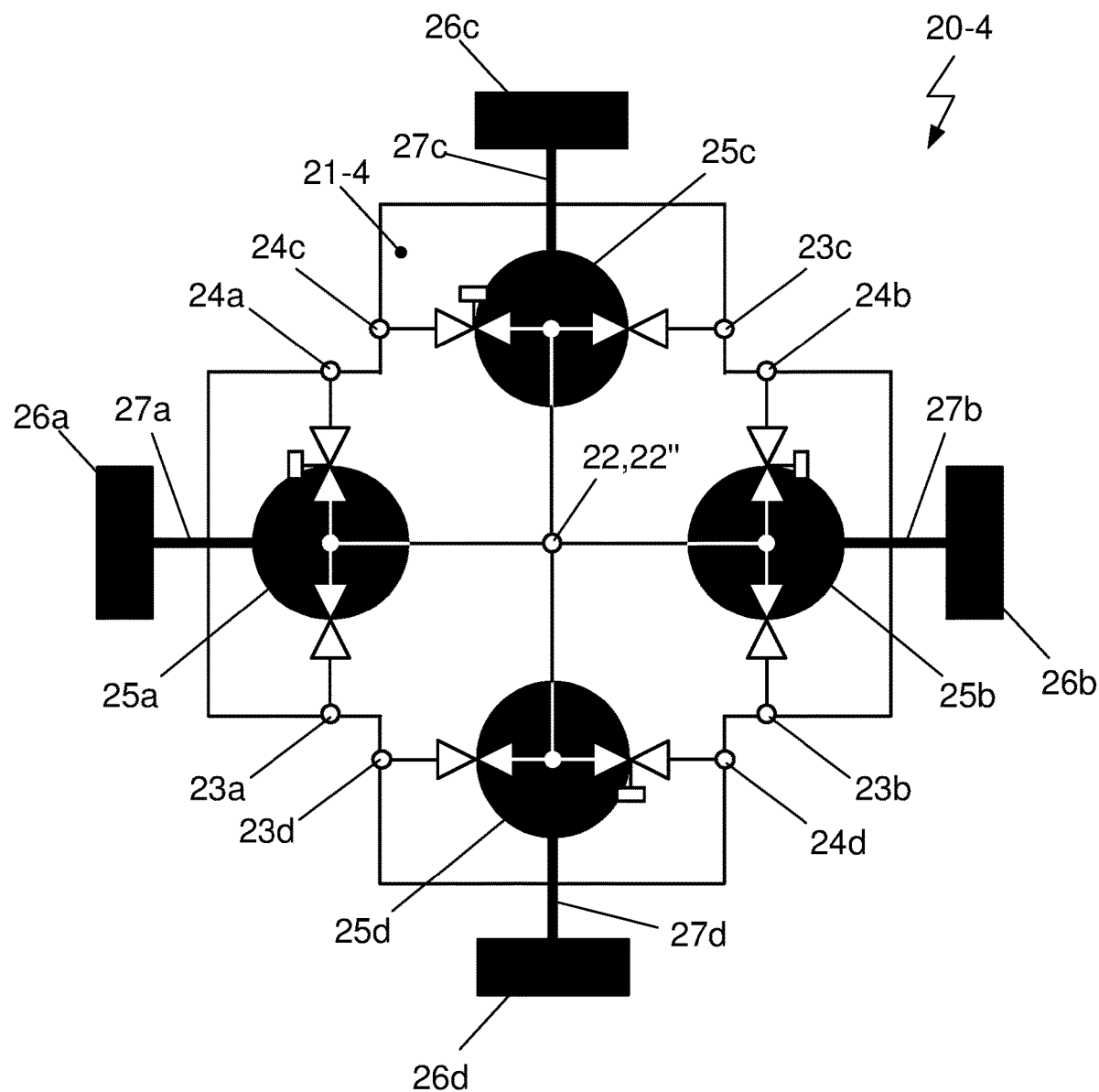

In FIG. 9 is depicted a fourth embodiment of the device 20-4 according to the invention as a multi-valve block solution analogous to the two-valve block solution according to FIG. 6. The device 20-4 is also developed as a highly integrated refrigerant valve for carrying out several functions in order to replace, in particular, at least eight valves of a refrigerant circuit of prior art and to reduce the number of components of the refrigerant circuit to one component.

Device 20-4 is substantially implemented of four devices 20-1 according to FIGS. 2 to 4, which are disposed within a common housing 21-4. The original devices 20-1 are connected with one another on the refrigerant side across the first ports 22. The coupling site of the first ports 22 corresponds to the connection site 22". The individual functions of the original devices 20-1 are therewith combined with one another.

The housing 21-4 of device 20-4 comprises four second ports 23a, 23b, 23c, 23d as inlets of the refrigerant as well as four third ports 24a, 24b, 24c, 24d for refrigerant lines in each case to a heat exchanger operated as evaporator. The ports 23a, 23b, 23c, 23d, 24a, 24b, 24c, 24d for refrigerant lines as connection lines with other components of the refrigerant circuit are each connected across passage opening with interior volumes of housing 21-4. Within the volumes one valve element 25a, 25b, 25c, 25d each is disposed according to the valve element 25 of FIG. 3.

The spherical valve elements 25a, 25b, 25c, 25d are each connected via a connection element 27a, 27b, 27c, 27d with a drive element 26a, 26b, 26c, 26d, disposed outside of housing 21-4.

In the case of even-numbered valve elements 25a, 25b, 25c, 25d two drive elements 26a, 26b, 26c, 26d are always disposed oppositely. All valves of device 20-4 are coupled on the refrigerant side across the original first ports 22 of device 20-1. The formation of a device with an odd number of valve elements is alternatively also feasible.

LIST OF REFERENCE NUMBERS 1a, 1b, 1c, 1d Refrigerant circuit
2 Compressor
3 Heat exchanger, first condenser/gas cooler
4 First valve
5 Heat exchanger, second condenser/gas cooler
6 Second valve
7 First flow path
8 Second flow path
9 Branch site
10 Opening site
11 Heat exchanger, first evaporator
12 First expansion element, expansion valve, valve
13 Heat exchanger, second evaporator
14 Second expansion element, expansion valve, valve
15 Third flow path
16 Fourth flow path
17 Branch site
18 Opening site
19a, 19b Connection site
20-1, 20-2, 20-3, 20-4 Device
21-1, 21-2, 21-3, 21-4 Housing
22 First port housing 21-1
22', 22" Connection site first ports
22z First port housing 21-3
23, 23a, 23b, 23c, 23d Second port housing 21-1, 21-2, 21-3, 21-4
24, 24a, 24b, 24c, 24d Third port housing 21-1, 21-2, 21-3, 21-4
25, 25a (First) valve element
25b Second valve element
25c Third valve element
25d Fourth valve element
26, 26a (First) drive element valve element 25, 25a
26b Drive element second valve element 25b
26c Drive element third valve element 25c
26d Drive element fourth valve element 25d
27, 27a Connection element drive element 26, 26a
27b Connection element drive element 26b
27c Connection element drive element 26c
27d Connection element drive element 26d
28 First opening valve element 25
29 Second opening valve element 25
30 Third opening valve element 25
31 First groove
32 Second groove
33 Rotational axis valve element 25
34 Direction of rotation valve element 25

It is claimed:

1. A device for controlling a refrigerant in a refrigerant circuit including at least one compressor, at least one condenser, and at least one evaporator wherein the device is disposed between the at least one condenser and the at least one evaporator and used as an expansion device, comprising a housing with ports for the connection to fluid lines, each of which being connected via a passage opening with at least one interior volume of the housing, and at least one valve element disposed in the interior volume of the housing, and a drive element for moving the at least one valve element relative to the housing, wherein the at least one valve element is supported rotatably about an axis of rotation and comprises at least openings formed as through-bores, which openings form in the interior of the at least one valve element a common volume, wherein an axis of symmetry of a first opening and the rotational axis of the at least one valve element is located on a common axis,
wherein a second opening and a third opening of the valve element are disposed in a common center plane of the at least one valve element at an angle with respect to one another differing from 0° and from 180°, wherein the center plane is oriented orthogonally to the rotational axis of the at least one valve element, and
wherein on the surface of the at least one valve element, starting at an edge of the third opening, at least one groove is formed which extends along the center plane of the at least one valve element;
wherein the through-bores have identical diameters that are constant over their length.

2. A device according to claim 1, wherein the at least one valve element is formed as a ball or a circular cylinder.

3. A device according to claim 1, wherein the first opening of the at least one valve element is on a side that is opposite to the side oriented toward the drive element.

4. A device according to claim 1, wherein the at least one valve element is oriented within the housing such that the through-bore of the first opening of the at least one valve element and the passage opening of a first port form a common passageway, wherein the axis of symmetry of the first opening of the at least one valve element and an axis of symmetry of the passage opening of the first port are located on a common axis.

5. A device according to claim 4, comprising two of the at least one valve elements oppositely disposed to each other, wherein the first passage openings of the two oppositely disposed valve elements are connected with one another at a single connection site.

6. A device according to claim 1, wherein axes of symmetry of the openings and the rotational axis of the at least one valve element have a common point of intersection in the center of the at least one valve element.

7. A device according to claim 1, comprising two of said at least one grooves, wherein on the surface of the at least one valve element, starting at the edge of the third opening, two grooves are formed as a first groove and a second groove which extend on both sides of the third opening along the center plane of the at least one valve element.

8. A device according to claim 1, wherein axes of symmetry of the passage openings of a first port, of a second port as well as of a third port of the housing and the rotational axis of the at least one valve element have a common point of intersection in which the at least one valve element is disposed with a center point.

9. A device according to claim 1, wherein the at least one valve element is connected across a connection element with the drive element, the drive element being disposed outside of the housing.

10. A device according to claim 9 comprising at least two of the at least one valve elements and at least two drive elements, wherein each of the at least two valve elements is connected with a respective drive element across a connection element such that the at least two valve elements are movable independently of one another.

11. A device according to claim 9, wherein the passage openings of a second port and of a third port are located on a first common axis and the passage opening of a first port and the connection element are located on a second common axis such that the first common axis and the second common axis form a T shape.

12. A device according to claim 11, wherein the first port is disposed on a side of the at least one valve element opposite to the drive element and that the second port and the third port are implemented on sides opposite to one another and differing from the side of the first port of housing.

13. A device according to claim 9, wherein the connection element is formed as a shaft.

14. A device according to claim 13, wherein the connection element is fixedly connected at a first end with the drive element and at a second end, formed distally to the first end, projects through a side of said housing into the housing and is connected with the at least one valve element.

15. A device according to claim 9, wherein an even number of the at least one valve element is provided.

16. A device according to claim 1, wherein the drive element is formed as a servomotor.

17. A device for controlling a refrigerant in a refrigerant circuit including at least one compressor, at least one condenser, and at least one evaporator, wherein the device is disposed between the at least one condenser and the at least one evaporator and used as an expansion device, comprising a housing with ports for the connection to fluid lines, each of which being connected via a passage opening with at least one interior volume of the housing, and at least one valve element disposed in the interior volume of the housing, and a drive element for moving the at least one valve element relative to the housing;

wherein the at least one valve element is supported rotatably about an axis of rotation and comprises at least openings formed as through-bores, which openings form in the interior of the at least one valve element a common volume, wherein an axis of symmetry of a first opening and the rotational axis of the at least one valve element is located on a common axis;

wherein a second opening and a third opening of the valve element are disposed in a common center plane of the at least one valve element at an angle with respect to one another differing from 0° and from 180°, wherein the center plane is oriented orthogonally to the rotational axis of the at least one valve element;

wherein on the surface of the at least one valve element, starting at an edge of the third opening, at least one groove is formed which extends along the center plane of the at least one valve element;

wherein on the surface of the at least one valve element, starting at the edge of the third opening, two grooves are formed as a first groove and a second groove which extend on both sides of the third opening along the center plane of the at least one valve element; and wherein the second groove is diametrically opposite to the second opening of the at least one valve element.

* * * * *